United States Patent [19]

Davis

[11] Patent Number: 5,421,862
[45] Date of Patent: Jun. 6, 1995

[54] FILTER FRAME AND REPLACEABLE FILTER SHEETS

[76] Inventor: Raleigh M. Davis, Rte. 2, Box 103-C, Fairmont, N.C. 28340

[21] Appl. No.: 181,773

[22] Filed: Jan. 18, 1994

[51] Int. Cl.⁶ .............................................. B01D 46/00
[52] U.S. Cl. ...................................... 95/273; 55/279; 55/491; 55/501; 95/285
[58] Field of Search ................ 55/279, 491, 493, 508, 55/511, 524, DIG. 31, 490, 494, 495, 501, 507, 509, DIG. 35; 95/273, 285

[56] References Cited

U.S. PATENT DOCUMENTS

| | | | |
|---|---|---|---|
| 2,182,501 | 12/1939 | Quave et al. | 55/490 |
| 2,719,598 | 10/1955 | Lindner | 55/491 |
| 2,771,963 | 11/1956 | Eichorn | 55/491 |
| 2,981,367 | 4/1961 | Sprouse | 55/491 |
| 3,218,784 | 11/1965 | Greiner | 55/491 |
| 3,287,003 | 11/1966 | Goettl | 55/491 |
| 3,755,995 | 9/1973 | Stickel | 55/DIG. 31 X |
| 3,942,964 | 3/1976 | Shuler | 55/501 |
| 3,971,877 | 7/1976 | Lee | 55/491 X |
| 4,493,718 | 1/1985 | Schweizer | 55/491 |
| 4,519,823 | 5/1985 | Kinney et al. | 55/493 |
| 4,876,076 | 10/1989 | Tsukahara et al. | 55/279 |
| 4,889,542 | 12/1989 | Hayes | 55/493 X |
| 5,100,445 | 3/1992 | Johnson et al. | 55/493 X |
| 5,133,789 | 7/1992 | Smith | 55/491 |

FOREIGN PATENT DOCUMENTS 479972  1/1952  Canada .................................. 55/491

*Primary Examiner*—C. Scott Bushey
*Attorney, Agent, or Firm*—Rhodes, Coats & Bennett

[57] ABSTRACT

The present invention entails a kit having comprised of a filter frame, at least one replaceable filter sheet, and fasteners for attaching the filter frame to an air return duct. The filter frame includes an air inlet side that includes a series of spot fasteners formed on the air inlet side wherein the fasteners serve to attach the filter sheet to the air inlet side of the filter frame. The filter sheet can be easily detached from the air inlet side of the filter frame and replaced by a fresh or new filter sheet.

3 Claims, 4 Drawing Sheets

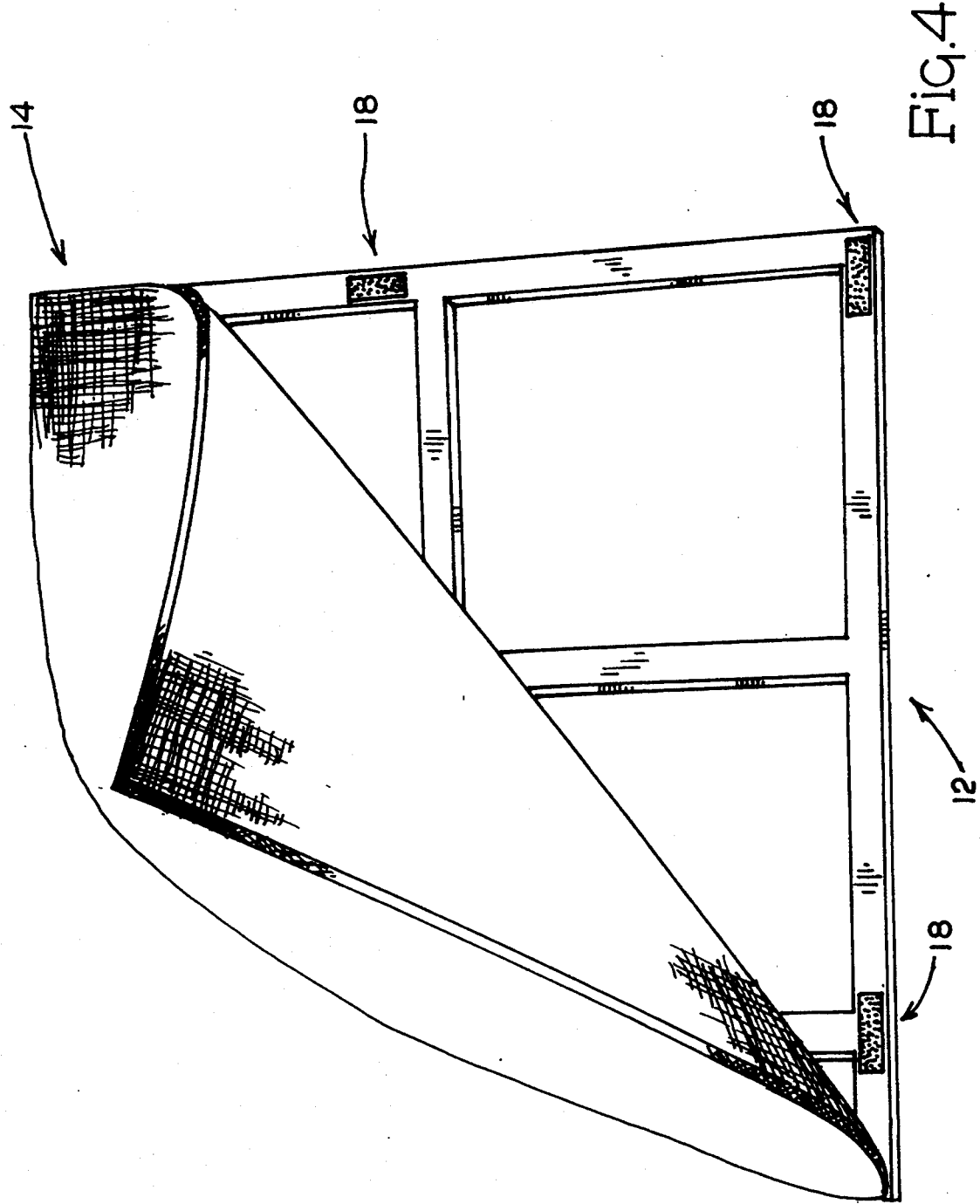

FILTER FRAME AND REPLACEABLE FILTER SHEETS

FIELD OF THE INVENTION

The present invention relates to filter systems and more particularly to an economical filter system that includes a filter frame that is attachable permanently in an air return and which is adapted to receive a replaceable and detachable filter sheet.

BACKGROUND OF THE INVENTION

It is common to manufacture air filters within a cardboard frame structure. Thus, each time a filter is replaced it is not only replaced with the filter itself but with a new frame structure. The end result is that this presents a relatively expensive filter to the consumer because that consumer continues to repurchase a frame structure time after time when in reality there is nothing wrong with the frame structure itself.

Also, because of the cost of manufacturing and shipping the frame structure, filter manufacturers have attempted to control the cost of conventional filters below a certain point and that in return has resulted in the filter itself being of poor quality and less than optimum in efficiency.

Therefore, there is a need for a low cost, highly effective, and highly efficient filter system that is particularly designed for residential use as well as non-residential applications.

SUMMARY AND OBJECTS OF THE INVENTION

The present invention entails a cost effective, high efficiency filter system that overcomes the drawbacks and disadvantages of filters of the prior art. In particular, the present invention entails a filter kit that comprises a filter frame that can be mounted permanently within an air return duct. One or more filter sheets is provided within a kit (or sold as replacements) and are designed to be detachably connected to the air inlet side of the filter frame mounted within the air return duct. Consequently, when the filter sheet has reached a saturation point and needs to be removed, the filter sheet is simply stripped away from the air inlet side of the filter frame and another clean filter sheet is attached to the air inlet side of that filter frame. Consequently, the consumer is only required to buy a filter frame one time and from that point on simply buys replaceable filter sheets that are attached to the air inlet side of the filter frame.

It is therefore the object of the present invention to provide a filter system or a filter kit of the type including a permanent filter frame that is designed to accept detachably mounted filter sheets thereto.

Another object of the present invention resides in the provision of providing a cost effective and highly efficient filter system for use in residential, commercial, and industrial applications.

Another object of the present invention is to provide a filter system having a filter frame designed for detachably mounting a replaceable filter sheet thereto wherein the filter sheets themselves are highly efficient but yet cost effective.

Another object of the present invention resides in the provision of a filter system that is easy to use and which can be easily installed by a consumer and which permits the filter sheet to be easily removed and replaced periodically.

Other objects and advantages of the present invention will become apparent and obvious from a study of the following description and the accompanying drawings which are merely illustrative of such invention.

BRIEF DESCRIPTION OF THE DRAWINGS

FIG. 4 is a fragmentary perspective view of the filter frame and an associated filter sheet with the frame being provided with Velcro ®-type attaching means for securing the filter to the filter frame.

DETAILED DESCRIPTION OF THE INVENTION

Figure 1:
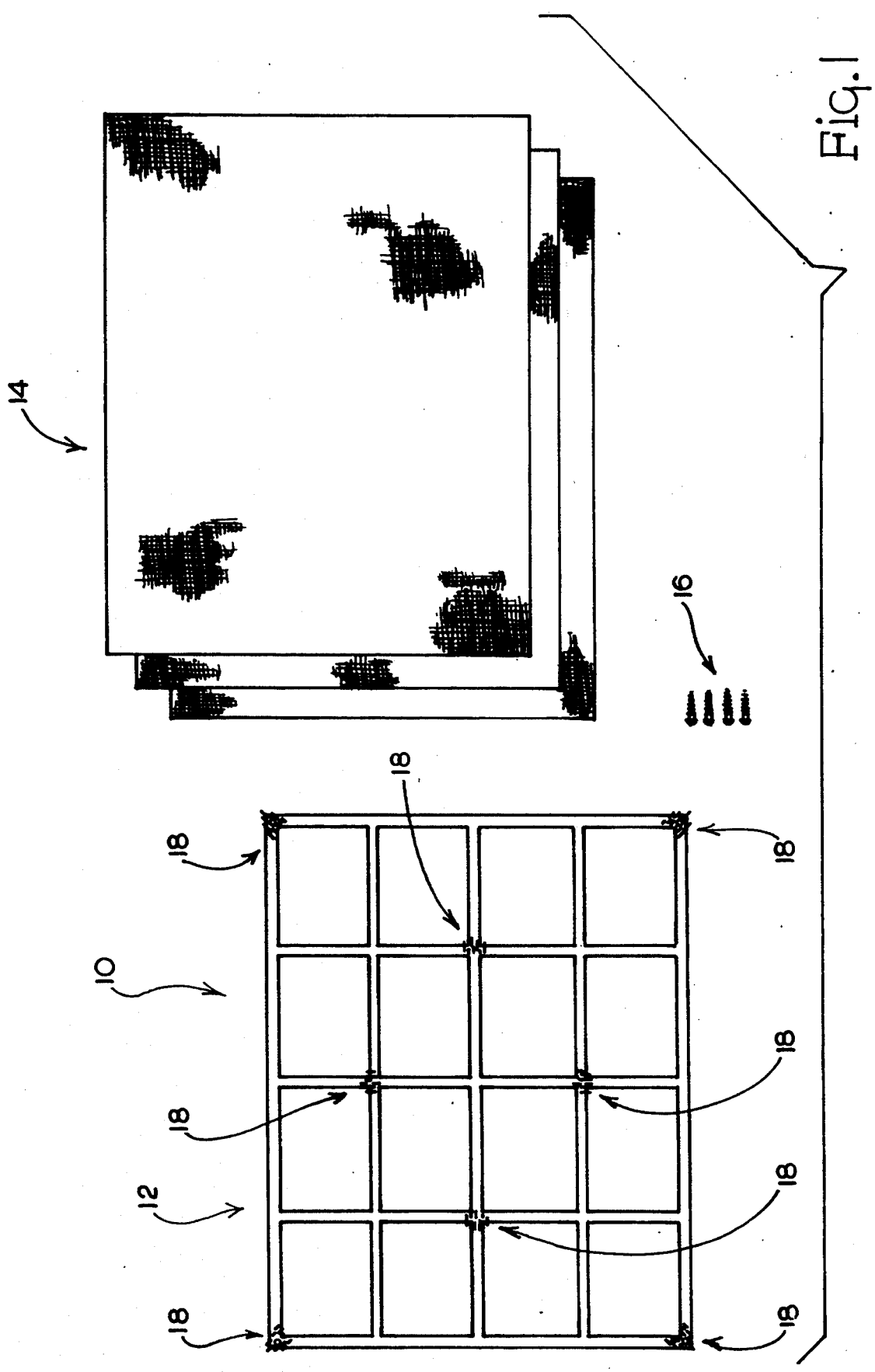
FIG. 1 is a top plan view of the components of the filter frame and replaceable filter sheet kit of the present invention.
Figure 2:
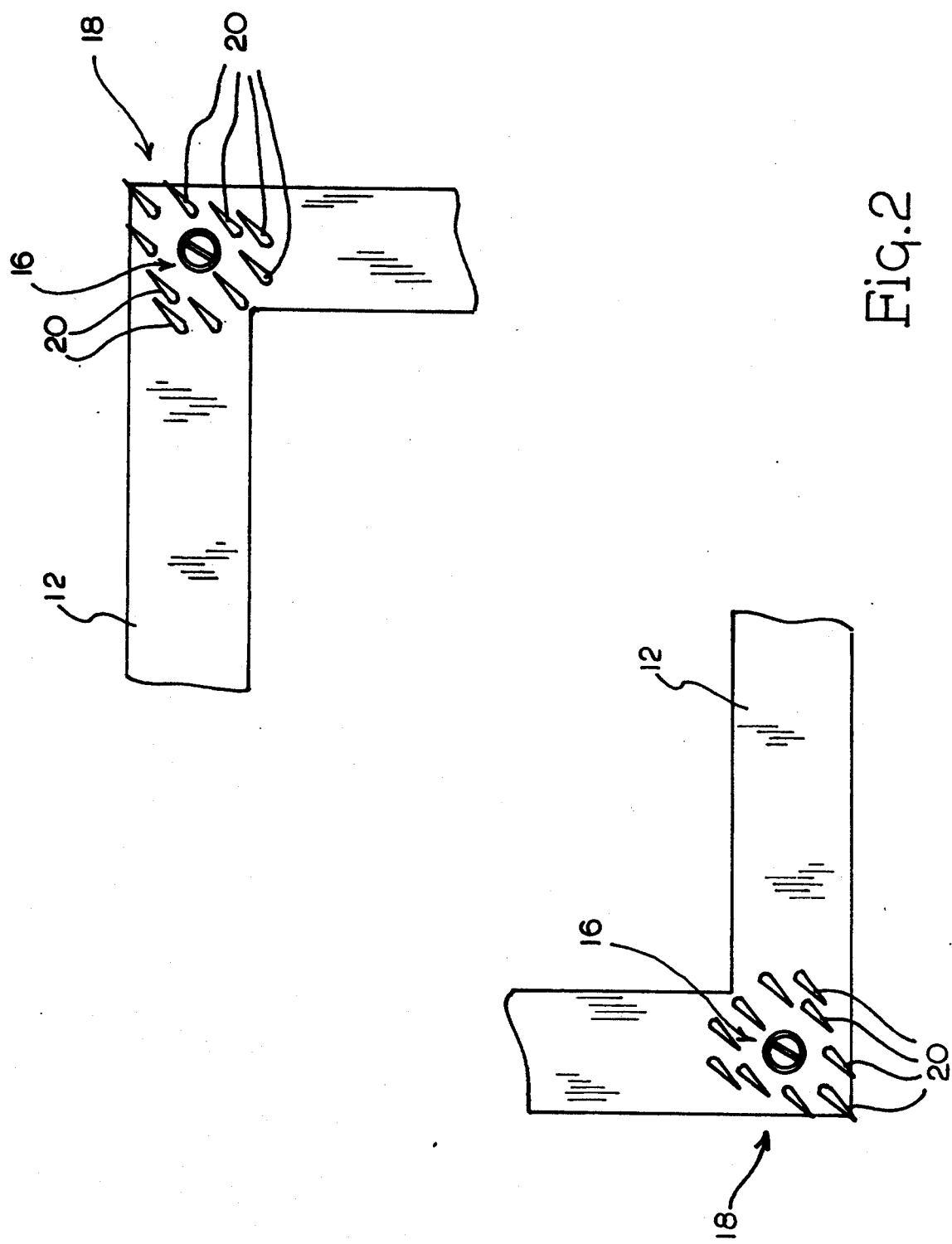
FIG. 2 is a fragmentary top plan view of opposed corners of the filter frame showing the opposed directed spikes that serve to attach a respective filter sheet to the filter frame.

With further reference to the drawings, the filter frame and replaceable filter kit of the present invention is shown therein and indicated generally by the numeral 10. Before proceeding with a detailed discussion of the individual components of the filter kit 10, the various components of the kit will be discussed. In this regard, the kit comprises a filter frame or open-grid indicated generally by the numeral 12, at least one and preferably a series of individual filter sheets indicated generally by the numeral 14, and a series of filter frame fasteners 16.

Figure 3:
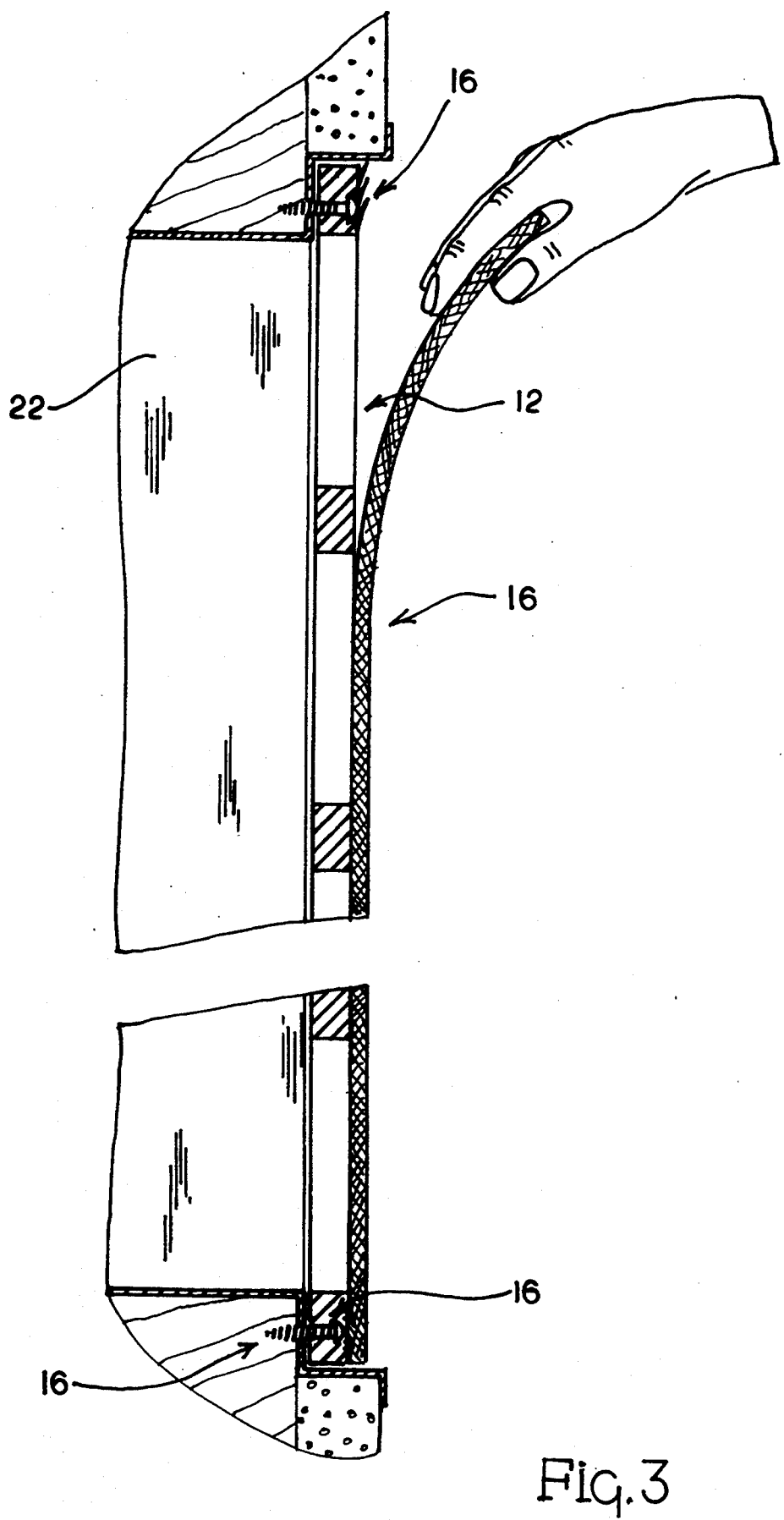
FIG. 3 is a vertical sectional view of the filter frame mounted within an air return and illustrating the filter being removed from the filter frame.

Turning to a discussion of the filter frame 12, it should be noted that the same is designed to be permanently mounted inside an air return duct (FIG. 3). Thereafter, the individual filter sheets 14 can be attached and detached from the air inlet side of the filter frame 12. It is appreciated that the filter frame 12 may be constructed of any suitable material but it is contemplated that a preferred manner of construction would entail forming the filter frame 14 out of molded plastic. It is seen that filter frame 12 is of the grate-type design and as noted above, includes an air inlet side and an air outlet side.

Filter frame 12 is designed to be permanently mounted within an air return duct indicated generally by the numeral 22 in the drawings. To mount the filter frame 12 within the air return duct 22 there is provided a selected type of filter frame fasteners 16. As shown with the kit 10, the filter frame fasteners 16 include a series of self-tapping screws that are screwed through the filter frame structure 12 and into a portion of the air return duct 22. This permanently affixes the filter frame 12 within the air return duct 22. It should be appreciated that other types of filter frame fasteners 16 could be used. For example, one could use double sided tape to tape a portion of the air outlet side of the filter frame to the air return duct 22.

The filter frame 12 includes a series of spot filter fasteners indicated generally by the numeral 18 formed on the air inlet side of the filter frame. Spot fasteners 18 are intended to fasten a respective filter sheet 14 to the air inlet side of the filter frame 12 in such a manner that the filter sheet 14 can easily be attached and detached from the filter frame 12. In the case of the present embodiment, each spot fastener 18 includes a series of short spikes that project out from the air inlet side of the filter frame 12 at a selected angle. Note that the spikes 20 are actually integrally formed with the filter frame structure 12. Spikes 20, in the alternative, could project straight out from the filter frame 12.

In the case of the embodiment disclosed, there are spot fasteners 18, in the form of the spikes 20, formed in spaced apart relationship around the outer periphery of the air inlet side of the filter frame 12. In addition, there is a second set of spikes formed interiorly of the spikes that are formed in spots around the outer periphery. As seen in the drawings, the group of internal spikes are formed in a diamond configuration about the grid of the filter frame 12.

It should be noted that opposed groups of spikes 20 are angled away from each other. For example, the group of spikes 20 formed upon opposite corners of the filter frame 12 would be angled in opposite directions with respect to each other. This would apply to all of the spot fasteners 18.

The individual groups of spikes 20 are designed to project through the filter sheet 14 and to support the filter sheet closely adjacent the air inlet side of the filter frame such that the filter sheet 14 is maintained in a relatively taut position about the filter frame. Because the spikes 20, in their respective groups, are particularly angled outwardly and opposite an opposed group of spikes 20, it follows that the entire group of spikes 20 tend to securely hold the filter sheet 14 tightly against the air inlet side of the filter frame 12.

It should be noted that the fasteners 18 could be in the form of a hook-and-loop type (Velcro ®) fastener, or any other suitable type fastener. In this regard, note FIG. 4 where the filter frame 12 is shown to include spot areas of Velcro ® fasteners. It should be pointed out that the filter sheet itself would not require a specific Velcro ®-type fastener as the filter material itself will attach and secure to the various Velcro ® fasteners formed on the air inlet side of the filter frame 12. However, it is appreciated that in the event that some filter material would not sufficiently adhere to a conventional Velcro ®-type fastener, that the filter sheet itself could be provided with mating Velcro ® fastener strips.

Also, it should be pointed out that while the present application has disclosed that the filter frame 12 can be permanently mounted in an air duct return, it should be appreciated that the filter frame 12 of the present invention can be utilized in situations where the filter frame itself would not be permanently mounted in an air return. For example, there are some applications where the filter frame 12 would simply slide into a slot within the air duct network. In this case, the filter frame would be removed from the air duct and the used filter sheet removed or stripped from the frame and a new filter sheet secured to the frame. Thereafter, the filter frame is reinserted back into the air duct. In this case, the filter frame 12 is used in a manner where the filter frame itself is not permanently attached to the air duct or air return structure.

Now, turning to the respective filter sheets 14, each filter sheet 14 is essentially a particulate type filter that is sprayed or treated with an anti-microbial agent such as AEGIS. Although the type of particulate filter can vary, a common type is known as a High-loft polyester synthetic filter medium. The filter can range from four to seven ounces per yard and will vary in thickness from one-fourth inch to one inch.

It is appreciated that once the filter has collected substantial dust and debris, etc., that it can be changed by simply removing the filter sheet 14 from the air inlet side of the filter frame 12 and replacing that used filter sheet with a new and clean filter sheet. An important part of this invention deals with the fact that these filter sheets 14 can be easily stripped or removed from the filter frame 12 so the new or fresh filter sheet 14 can be easily and conveniently attached to the air inlet side of the filter frame 12 by again projecting the individual spikes 20 through the filter sheet.

It follows from the above discussion that the present invention presents a very cost effective filter kit and filter system because the consumer is not required to repeatedly pay for a filter frame when he or she purchases an air filter. This permits the manufacturer to provide a very efficient and effective filter 14 at a reasonable cost.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A method of installing and replacing filters within a conventional air return duct comprising the steps of:
   a) mounting an open grid, having an inlet air side and an outlet air side, directly into the return air duct such that the open grid sets transversely in the air return duct;
   b) providing stationary hook-loop type spot attachments on the inlet side of the open grid;
   c) attaching a unframed filter having an inlet side and an outlet side to the open grid and wherein the step of attaching includes attaching the outlet side of the unframed filter directly to the attachments on the inlet air side of the open grid by projecting the stationary spot attachments directly into the outlet side of the unframed filter such that the inlet side of the filter is completely exposed and wherein the sole support for supporting the unframed filter to the open grid is derived through the attachments that are effectively sandwiched between the outlet side of the filter and the inlet side of the open grid;
   d) replacing the unframed filter by stripping the filter from the grid; and
   e) attaching a new unframed filter to the air inlet side of the grid in the same manner.

2. A replaceable filter kit wherein a filter forming a part of the kit is detachably secured to an open grid which is designed to be permanently mounted in a conventional air return duct, the filter kit comprising:
   a) an open grid for being inserted directly into an air return duct such that the open grid spans the entire conventional air return duct;
   b) the grid including an air inlet side and an air exit side;
   c) a series of stationary hook-loop type filter attachments formed on the air inlet side of the grid with the filter attachments being spaced about the air inlet side of the grid;
   d) at least one unframed filter, having an inlet side and an outlet side, provided with the kit with the filter sized to be attached to the filter attachments formed on the air inlet side of the grid;

e) the stationary filter attachments projecting from the air inlet side of the grid and projecting into the outlet side of the filter so as to fix the filter to the open grid such that the filter is totally supported by the stationary filter attachments that leave the inlet side of the filter totally exposed and free of attachments: and f) wherein the filter attachments project from the air inlet side of the grid and detachably secure the filter to the grid and wherein the filter can be readily detached from the grid and replaced by a clean filter thereby avoiding the requirement of providing a filter frame with each new filter.

3. The replaceable filter kit of claim 1 wherein at least one filter forming a part of the kit is treated with an anti-microbial agent.

* * * * *